(12) United States Patent
Ombrellaro et al.

(10) Patent No.: US 7,967,679 B2
(45) Date of Patent: Jun. 28, 2011

(54) TACTILE WEARABLE GAMING DEVICE

(75) Inventors: Mark P. Ombrellaro, Bellevue, WA (US); Baltazar Soto, Jr., Seattle, WA (US); Aaron Leonard Morris, Snoqualmie, WA (US); Joshua John Kelly, Everett, WA (US); Patrick A. Ombrellaro, Issaquah, WA (US)

(73) Assignee: Cel-Kom LLC, Bellevue, WA (US)

( * ) Notice: Subject to any disclaimer, the term of this patent is extended or adjusted under 35 U.S.C. 154(b) by 744 days.

(21) Appl. No.: 11/952,833

(22) Filed: Dec. 7, 2007

(65) Prior Publication Data

US 2008/0153590 A1   Jun. 26, 2008

Related U.S. Application Data

(60) Provisional application No. 60/869,056, filed on Dec. 7, 2006, provisional application No. 60/957,136, filed on Aug. 21, 2007.

(51) Int. Cl.
*A63F 11/00* (2006.01)
(52) U.S. Cl. .......................................... 463/30; 463/47
(58) Field of Classification Search .................. 463/30, 463/47
See application file for complete search history.

(56) References Cited

U.S. PATENT DOCUMENTS

| | | | |
|---|---|---|---|
| 3,736,551 A | 5/1973 | Hirsch | |
| 5,035,242 A | 7/1991 | Franklin | |
| 5,143,505 A * | 9/1992 | Burdea et al. | 414/5 |
| 5,354,162 A * | 10/1994 | Burdea et al. | 414/5 |
| 5,565,840 A | 10/1996 | Thorner | |
| 5,669,818 A | 9/1997 | Thorner | |
| 5,719,561 A | 2/1998 | Gonzales | |
| 5,950,628 A | 9/1999 | Dunfee | |
| 6,004,209 A * | 12/1999 | Katsumoto et al. | 463/30 |
| 6,326,901 B1 | 12/2001 | Gonzales | |
| 6,422,941 B1 | 7/2002 | Thorner | |
| 6,726,638 B2 * | 4/2004 | Ombrellaro | 600/587 |
| 6,930,590 B2 | 8/2005 | Ling | |
| 7,046,151 B2 | 5/2006 | Dundon | |
| 7,331,871 B2 * | 2/2008 | Lopez | 463/47 |
| 2004/0008104 A1 | 1/2004 | Endsley | |
| 2004/0046777 A1 | 3/2004 | Tremblay | |
| 2004/0229702 A1 | 11/2004 | Cooke | |
| 2005/0010150 A1 | 1/2005 | Firsov | |
| 2005/0073439 A1 | 4/2005 | Perricone | |
| 2005/0113167 A1 | 5/2005 | Buchner | |
| 2005/0132290 A1 | 6/2005 | Buchner | |
| 2005/0162258 A1 | 7/2005 | King | |
| 2005/0225443 A1 | 10/2005 | Lerg | |
| 2005/0250582 A1 | 11/2005 | Lopez | |
| 2006/0144213 A1 | 7/2006 | Mann | |

\* cited by examiner

*Primary Examiner* — Dmitry Suhol
*Assistant Examiner* — David Duffy
(74) *Attorney, Agent, or Firm* — Christensen O'Connor Johnson Kindness PLLC

(57) ABSTRACT

A tactile garment, such as a gaming vest (420) or other garment or body-enveloping device. A pneumatic force-generating device (425) is embedded in the vest in multiple cell zones for selectively applying a modulated force to a user wearing the multi-layered vest. A compressed air source comprising a compressor (612) and an associated canister (606) selectively actuates the pneumatic force-generating devices to produce a tactile response. A control valve assembly couples the pneumatic force-generating device to the compressed air source. A controller (426) selectively opens and closes the control valve to modulate the pneumatic force-generating device and generate forces simulating real forces, such as impact and G-forces. Force sensors may be deployed in the cell zones to provide force data for generating secondary forces.

19 Claims, 8 Drawing Sheets

TACTILE WEARABLE GAMING DEVICE

CROSS-REFERENCE TO RELATED APPLICATIONS

This application claims the benefit of U.S. Provisional Application No. 60/869,056, filed Dec. 7, 2006, entitled "TACTILE EVENT GARMENTS AND RECORDING SYSTEM," and U.S. Provisional Application No. 60/957,136, filed Aug. 21, 2007, entitled "TACTILE WEARABLE GAMING DEVICE," the disclosures of both of which are hereby expressly incorporated by reference, and the filing dates of which are hereby claimed under 35 U.S.C. §119(e).

BACKGROUND

In 1972, the release of the game Pong™ marked the beginning of the video game industry. Since that time, there has been explosive growth in the computer gaming and entertainment industries coincidental with developments in computer technology. Major developments in sound cards, graphics cards, graphics accelerators, CD Rom drives, and joystick technologies, essential aspects of modern computers, all evolved out of the gaming industry to a large extent. Advances in computer processing power and the development of the internet have lead to the increased complexity and realism of computer-generated animation and gaming.

With gaming in particular, improvements in three-dimensional ("3-D") graphics have allowed development of games with more life-like characters, realistic movements, and complex environments. The ultimate goal in many gaming programs and systems is to enable the virtual characters therein to move and behave within the virtual environment in a natural way that emulates a physical environment as closely as possible, and to provide the user with a virtual environment that more closely simulates the experience of being in the game. The development of online games, such as massively multiplayer online games, now gives users the ability to interact with multiple players in different locations to enhance the strategy options, interactivity, and realism of the game. As the quest for additional realism continues, adding haptic (tactile) or touch sensory characteristics to the virtual environment represents a major opportunity to enhance the end-user's entertainment experience. Currently, the state of the art in tactile feedback consists of vibration within joysticks or hand control units to simulate movement and resistance. This is a very limited sensory response and is not representative of the true tactile event or environment.

Computer modeling of tactile information has been evolving over the last fifteen years. Currently, tactile feedback information is being incorporated into some virtual reality systems, such as training simulators for the aircraft, computer, and medical industries, and computer games. The state of the art of tactile feedback for these systems typically consists of providing the user with a resistance or vibratory force to either simulate an encountered resistance or to act as an event indicator. From a morphological and physiological standpoint, these systems are designed to produce a low level vibration, or "rumbling" stimulus, which activates the vibratory sensory pathways of the user.

These types of vibratory stimuli are characteristically produced by small motors, with or without off-set cam systems, which emit the vibrations and are felt by the user. See, for example, U.S. Pat. No. 5,565,840, to Thorner et al. These devices are readily available and of low cost, so they have been the mainstay of "tactile or force feedback" game peripherals. Taking a step back and examining the technology and user experience, these systems just act as a rough proxy or indicator for game events that are delivered via another sensory pathway other than sight or sound. They do not truly differentiate nor accurately represent the various types of actions or forces occurring within the game, but are widely applied across all types of action within the game and used merely to indicate that some event of note is occurring within the game.

However, such prior art devices are not capable of producing certain force responses that may be desirable. For example, in first person shooter games, when a character in the game is struck or shot, the keyboard or hand controller may vibrate, indicating an unfavorable event within the game is occurring. The vibration of the controller or keyboard is of course not representative of the actual event occurring to the game character. A gun shot or blow to the chest or back is not well-represented by a low level rumble or vibrational force to the user's hand. A preferable tactile response would produce a location specific impact to the user. Preferably, the intensity of the tactile response would vary, for example with distance, bullet caliber, weapon type, etc.

In a game scenario, a more realistic experience would provide an actual location-specific impact stimulus that could be influenced by various parameters (e.g., weapon type, weapon size, distance to target, presence or absence of body armor), and correspondingly impart a variable force to more accurately emulate the gaming events, of course without actually inflicting actual damage or harm. In prior patents and applications by the present inventor, a tactile or impact generating system is disclosed that will allow for the actual imparting of forces to the users body. It is contemplated herein that the imparted forces may be modulated to simulate a wide variety of actions and events.

Currently, there are several hundred PC games that enable such force-feedback functionality and an estimated five million installed force-feedback peripherals. There remains a need, however, for advances in tactile gaming devices and systems and in providing tactile gaming devices that are effective, reliable, durable and manufacturable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one aspect of the present disclosures, a tactile gaming vest having multiple layers is disclosed. A pneumatic force-generating device is embedded in the vest for selectively applying forces to a user wearing the multi-layered vest. A compressed air source is used to power the pneumatic force-generating device. A control valve couples the pneumatic force-generating device to the compressed air source. A controller selectively opens and closes the control valve to modulate the pneumatic force-generating device. Other types of garments, such as pant legs and gloves, may be used instead of or in addition to the gaming vest.

In accordance with one aspect of the present disclosures, a tactile gaming vest is disclosed including multiple embedded force-generating devices for delivering a modulated force to a user wearing the gaming vest. A power distribution network, such as a pneumatic, hydraulic, electrical network, provides appropriate power to the embedded force-generating device. A controller controls the generation of the modulated force according to a modulated control signal. A power-switching component, such as a valve or an electrical switch, is used to control the flow of the appropriate type of power to the embedded force-generating device.

In accordance with yet one aspect of the present disclosures, a method for delivering tactile stimuli to a user of a gaming vest is disclosed. The method includes: using a modulated control signal by a controller for controlling a power-switching component, such as a valve or an electrical switch, according to the modulated control signal; using the power-switching component, distributing the appropriate type of power to at least one of an array of linear motion force-generating devices embedded in the gaming vest; and using the distributed power, generating a force inwardly to the body of a user wearing the gaming vest in accordance with the modulated control signal.

In accordance with yet one aspect of the present disclosures, a system for delivering tactile stimuli is disclosed, including a signal generator component for generating a modulated control signal, a tactile force software library for providing information to the signal generator component used in generating the modulated control signal, a tactile garment, such as a gaming vest, including at least one embedded force-generating device for delivering a modulated force according to the modulated control signal to a user wearing the multi-layered garment, a power distribution network for providing power to the embedded force-generating device, a controller for controlling the generation of the modulated force by the embedded force-generating device according to a modulated control signal, and a power-switching component, such as a valve or an electrical switch, for controlling the flow of power to the embedded force-generating device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

System Overview

The systems and devices described herein acquire and record physical tactile stimuli, and/or selectively play back recorded or otherwise simulated tactile event stimuli to a user.

In an exemplary embodiment, a wearable device is disclosed that receives activation signals from a user's computer, and produces tactile stimuli to a user wearing the wearable device based on the activation signals. For example, the activation signals may be generated to represent specific events occurring in a game play, and the tactile stimuli may simulate the specific event. Alternatively, in a movie or other playback application, the activation signals may represent specific events occurring in the movie or other recorded scenario. Although the currently preferred complete system comprises two independent wearable interfaces, i.e., a recording interface (mastering unit) and a playback interface (consumer unit), it is contemplated that either the recording interface or the playback interface may be utilized independently of the other. For example, the recording interface and the playback interface may be used as independent components or as related components in an entire system to record and "play back" tactile information to users in the context of video games, interactive entertainment, or other recorded or live media.

The present technology differs from the currently available force feedback systems through its ability to convey a broad range of physical sensory stimuli including emulation of touch, impact, resistance, and pressure forces to enhance the realism of all forms of on-line, PC, or console based game content. Additionally, the present technology may be used for specifically emulating G-force effects for racing, flight, and other types of recorded or live game and media content. Details of another embodiment of the invention is disclosed in U.S. Provisional Application No. 60/869,056, filed Dec. 7, 2006, entitled, "Tactile Event Garments and Recording System," which is a related subject matter by the same inventor, and the disclosure of which is expressly incorporated herein by reference in its entirety.

Figure 1:
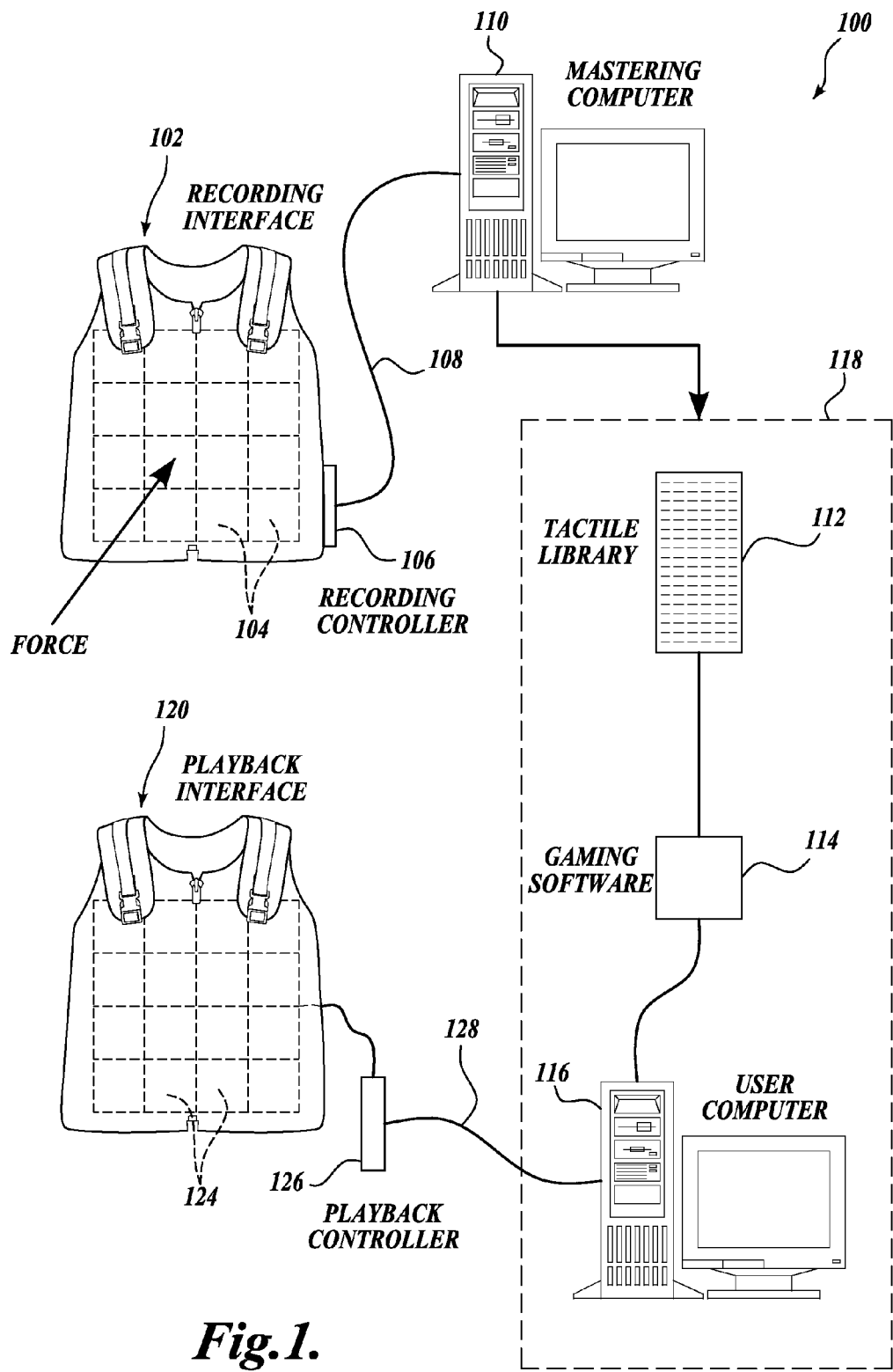
FIG. 1 is a schematic of a tactile recording and playback system in accordance with the present invention.

A schematic diagram of a tactile recording and playback system 100 is shown in FIG. 1. A wearable recording interface 102, which may be formed, for example, as a vest or other wearable device, is provided having an array of pressure sensing elements 104 incorporated therein. The pressure sensing elements 104 are connected to a recording controller 106 that transmits data received from the pressure sensing elements 104 in response to externally applied forces (indicated by arrow FORCE) to a mastering computer 110 via cable 108. The mastering computer 110 processes the information from the recording controller 106, to generate a master library of tactile event information 112, which may be used for selectively playing back or recreating the recorded tactile events via a playback interface 120 discussed below. The master library 112 may be accessed by other gaming software 114, for example, software installed on a dedicated gaming system or other user computer 116 which is operably connected to the playback interface 120.

The playback interface 120 is a wearable device, which typically corresponds in overall form to the recording interface 102. The playback interface 120 includes an array of force-generating devices or cells 124 that are arranged in a manner similar to the array of pressure sensing elements 104. The playback interface 120 also includes a playback controller 126 that receives signals from the user computer system 118 via cable 128. A master copy of the tactile library 112 may be originally created on a primary mastering computer 110 or a data server for redistribution to user computer systems 118. The playback controller 126 uses the signals received from the user computer 116 to control the array of force-generating devices 124 to impart a desired force on the user wearing the playback interface 120.

Although FIG. 1 shows the recording interface 102 and playback interface 120 simultaneously, it is contemplated that these two system components would typically be used separately, wherein the recording interface 102 is used to create the library of tactile event information 112 for later use by users having the playback interface 120. It is contemplated that the communications link between the user computer 116 and the playback interface 120, and/or the link between the mastering computer 110 and the recording interface 102, may be accomplished by other means, such as a wireless communication system.

Figure 2:
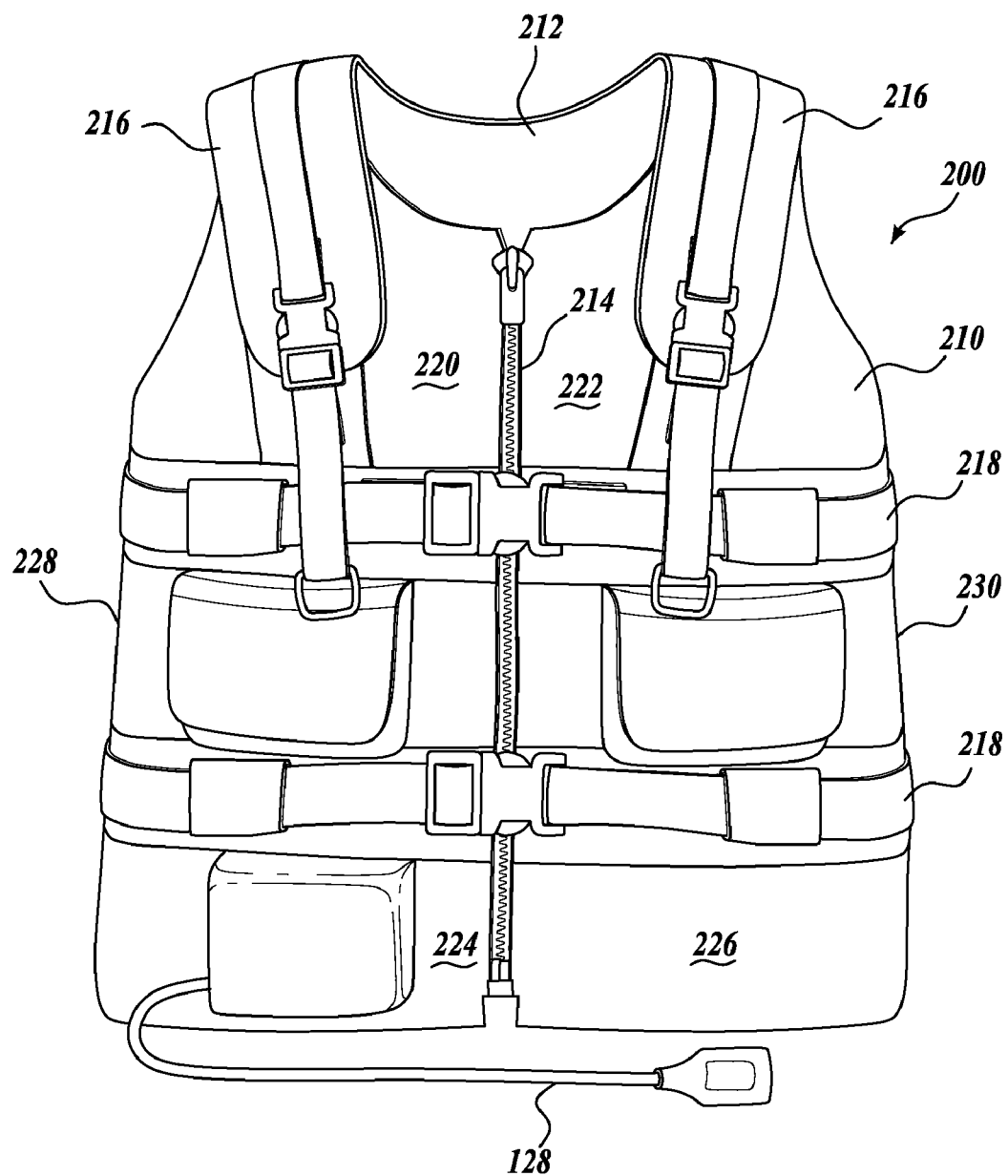
FIG. 2 is a picture of a current embodiment of the vest shown schematically in FIG. 1, including the power supply, control box and cable.

An illustrative embodiment of the playback interface 120 is shown in FIG. 2 and comprises a wearable device 200, such as a vest, that incorporates multiple force-generating devices (not visible in the figure), which are modulated by the playback controller 126 to deliver the specific characteristics of the desired tactile event to the user. In this embodiment, the force-generating devices are pneumatic, although, in other embodiments, a hydraulic pressurizing medium or an electromechanical structure/component, such as solenoids or the like, could also be used to produce similar tactile stimuli to the user.

Recording Interface

Figure 3:
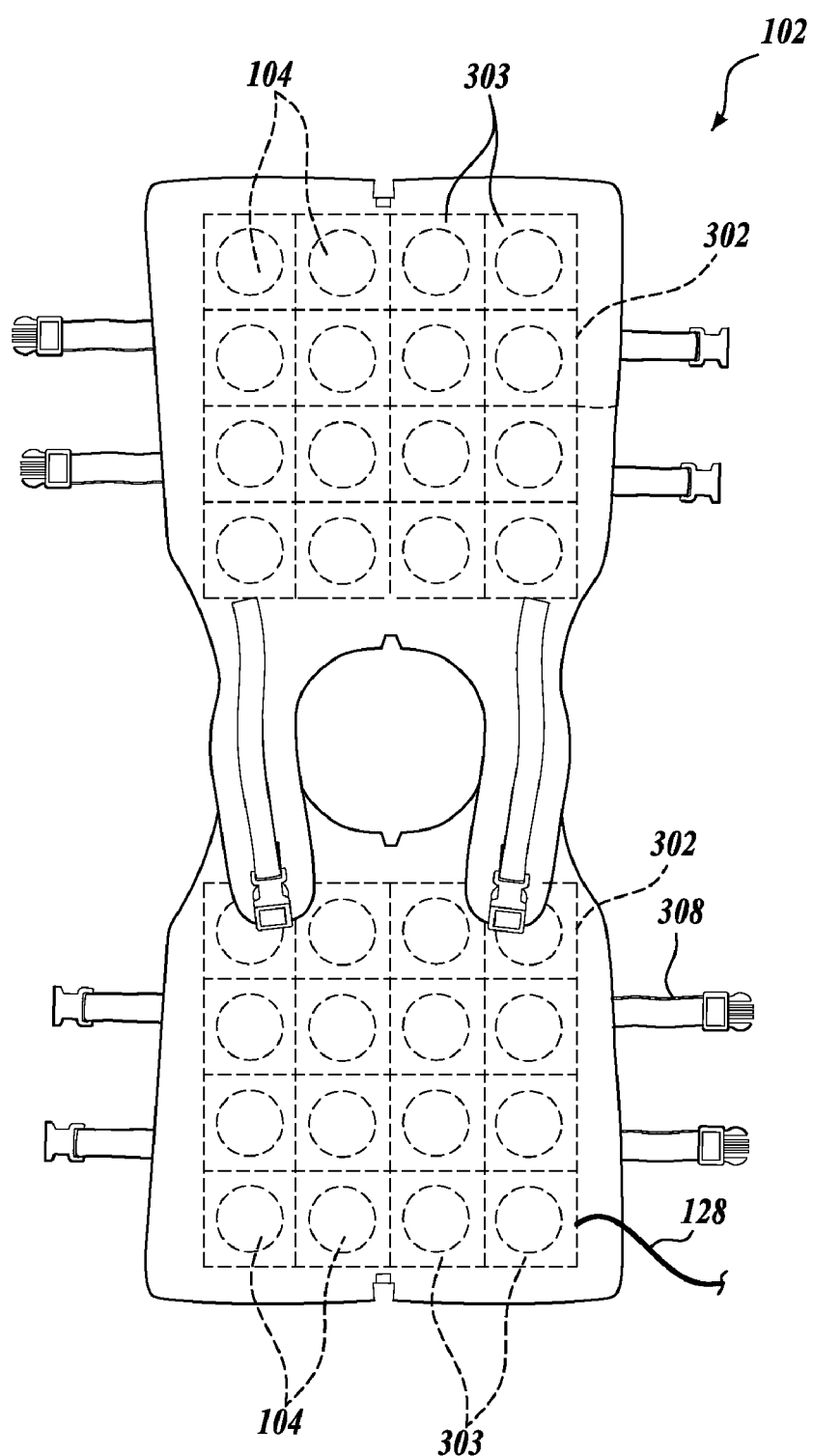
FIG. 3 is a sketch of the recording interface shown in FIG. 1, shown in an opened position.

The recording interface 102 receives and records tactile and/or other sensory data and records the data into a data storage device, typically onto a recordable media in the mastering computer 110. As shown in FIG. 3, in an illustrative embodiment, the recording interface 102 comprises a garment that may be made from soft, compliant material, such as a natural or polymeric fabric. One or more pliable or semi-rigid support pads 302 are provided therein, for example, nylon, rubber, silicon, or a soft plastic substrates. Of course, other suitable materials such as wood, paper, aluminum, or the like could alternatively be used for device construction, and may have advantages in some applications. The entire pad 302 is preferably uniform, and optimally incorporates some viscoelastic properties, for example, to simulate a skin surface. The recording interface 102 is typically conformable and wearable.

The recording interface 102 is worn directly over a user's body surface and may be conveniently held in place using straps or other fastening means. In one illustrative embodiment, a nylon hooks-and-loops binder type of closure may be used. The nylon closure provides adjustability and permits a single recording interface 102 to be used by different users having a wide variety of body shapes and sizes. In another illustrative embodiment, a buckle-type fastener 308 may be utilized. The support pad 302 may be formed into: vests for chest applications; binders for abdominal applications; sleeves, gauntlets, or gloves for upper extremity applications; pant legs or boots for lower extremity applications; or small strips for small applications such as fingers or toes. Optimally, the working sensory surface of the pad 302 is oriented outward (away from the user's body), enabling maximum activation with an externally applied sensory stimulus (indicated by arrow labeled FORCE in FIG. 1). While this is the optimal functional orientation, there may be additional uses where orienting the pad with the sensory surface facing the user's body is appropriate or a pad construction incorporating sensing devices along both inner and outer surfaces. The functionality of the recording interface 102 can also be expanded by incorporating a single or multi-channel pressure transducer, temperature receptors, vibratory receptors, and position receptors. Additional receptors would be oriented with the working/receiving surface in any direction but optimally inward towards the user's body and allow for the simultaneous acquisition of complex sensory information in real time.

Each support pad 302 is subdivided into a basic structural unit or cell zone 303 which contains a pressure sensing element 104. The overall size of the pad 302, as well as the number of cell zones 303 within each type of pad 302, may vary to suit the particular application. Within each cell zone 303, a pressure-sensing element 104 is mounted, such as a single channel pressure transducer oriented with the working/receiving surface facing outward. In one illustrative embodiment, the structure of the support pad 302 is one-piece with a multitude of pressure-sensing elements 104 embedded within the support pad 302. The back surface of the support pad 302 is supported by a flexible or semi-rigid sheeting. The preferred sheeting would be a plastic or polymer panel that would form a relatively rigid backing, yet allow for some bending to accommodate applications to a variety of body sizes. In addition to the pressure-sensing elements 104, it is anticipated that other sensory receptors could also be incorporated into each cell structure. Additional sensory receptors might include temperature receptors, vibratory receptors, and position receptors. Additional receptors would allow for the simultaneous acquisition of complex sensory information in real time.

The recording interface 102 is attached to the recording controller 106, for example, via an electrical umbilical cord or wireless connection, as illustrated in FIG. 1. In one illustrative embodiment, the recording controller 106 includes a power supply, a small central processing unit, a signal processor, digital to analog converter if required, and a communications system to receive and transmit data and be linked to the mastering computer 110. Those skilled in the art will appreciate that the recording controller 106 may be implemented in various combinations of hardware and software depending on considerations of cost, flexibility, size, etc. The recording controller 106 may include only the necessary hardware to collect tactile data to send to the user computer 116 for signal processing tasks such as noise filtering.

Alternatively, the recording controller 106 includes the necessary hardware and software/firmware to collect data and perform some signal processing such as signal conditioning, amplification, and filtering. In yet another illustrative embodiment, the functions of the recording controller 106 may be distributed partially within the recording wearable device 102 and partially within the mastering computer system 110, eliminating the need for a central recording controller. In one illustrative embodiment, a low power version of the recording controller 106 is linked directly to the mastering computer 110 via a USB-type connection, not requiring any additional external power source. In yet another embodiment, the recording interface 120 is completely self-contained with computing resources, such as processor and memory, built in. In such embodiment, the collected data are stored on a removable media, such as flash disks, to be transferred to an external server including a central tactile event library for redistribution to game consoles or user computers 116. Alternatively, in such embodiment, the collected tactile data may be transmitted, by wire or wirelessly, to a receiving server for storage in the tactile event library 112.

Various illustrative embodiments of the communications system for the recording controller 106 include an internal modem for connection to the mastering computer 110 or direct connection to a land based or direct wired telephone line, or any other current or future device which would allow for: (1) light-based/optical based communications including fiber-optic cable channels and non-fiber, light based methods of data/voice/visual signal transmission; (2) wireless communications including but not limited to radiofrequency, ultra-high frequency, microwave, or satellite systems in which voice and/or data information can be transmitted or received; and (3) any future methods of voice or data transmission utilizing any currently unused mediums such as infrared light, magnetism, other wavelengths of visible and non-visible radiation, etc. Optimally, this recording controller 106 would be away from the user for considerations of reduced weight being applied directly to the user, size limitations if the recorder interface 102 is placed on a small section of the body, such as a limb or finger, or possibly safety (reduced RF or microwave radiation exposure from communications/data transmissions). An umbilical section would contain the contact wires between the pressure sensing elements 104 within the functional subunits and the power supply.

In one illustrative embodiment, the recording interface 102 configuration incorporates single or multiple multi-channel pressure transducer/resistor devices. To increase the sensitivity and functionality of the device, each cell zone could be multiply subdivided and a suitable number of pressure transducer/pressure resistor (response) subunits provided throughout the device. The number of functional subunits would only be limited by the ability to miniaturize these bidirectional pressure transducing subunits. This would allow for the ability to produce and receive mechanical and/or sensory inputs from every portion of the recording interface.

When the recording interface 102 encounters an externally applied force, the device converts the mechanical force detected at the various cell zones into a digital force signal and transmits it to the mastering computer 110. Alternatively, to make the recording interface 102 lighter and more pliable, raw or slightly conditioned signals (for example, filtered and amplified analog signals) may be transmitted to the mastering computer 110 for digitization and other processing. For example, the entire body surface may be subdivided into specific anatomic regions, each having its own corresponding wearable device. It is contemplated that the recording interface 102 may be worn by a stunt person and used to record actual tactile stimuli, such as G-forces, falls, punches, or kicks as encountered by the stunt person. The tactile data may be recorded, processed, and stored as a library of reproducible tactile events, along with audio and video data, and incorporated into videogames, movies, or other types of live or recorded media, to ultimately be "played back" to the user via the playback interface 120. Using the recording interface 102, the master library of tactile event information 112 is generated. The library 112 may be used by video game creators, for example, to integrate tactile sensory characteristics captured from actual events into various games and/or other virtual environment.

Playback Interface

Referring still to FIG. 1, the playback interface 120 is a wearable device similar to the recording interface 102 and incorporates multiple force-generating devices (not shown in FIG. 1) that are modulated to deliver the specific characteristics of the desired tactile event to the user. Suitable force-generating devices are disclosed in U.S. Pat. No. 6,726,638 to the present inventor, which patent is hereby incorporated by reference in its entirety. As illustrated in FIG. 1, the playback interface 120 preferably includes adjustable closures, and is sized to generally correspond to the recording interface 102. A playback controller 126 receives signals from the user computer 116, typically in response to interactive signals generated by the gaming software 114 utilizing the tactile event information library 112.

Now referring back to FIG. 2, an illustrative embodiment of the playback interface 120 comprises a pliable vest 200 having at least three layers. Although other combinations of materials will be apparent to persons of skill in the art, in this embodiment, the vest 200 includes: (1) an outer layer made from a natural or synthetic fiber such as cotton or nylon which allows for a flexible but durable garment; (2) a middle layer referred to as the backing layer; and (3) an inner layer that may be made from, for example, a combination of nylon and a more flexible, elasticized material such as Lycra®. The vest 200 is designed with certain desirable features, including: (a) front and back panels 210, 212, respectively, that are not directly sewn together along the sides of the vest 200; (b) a longitudinal zipper 214 bisecting the front panel 210 for easy entry; (c) adjustable sleeves 216 designed to extend over the user's shoulders and allows for fit adjustments; and (d) horizontal straps 218 that stabilize the front and back panels 210, 212 and allow for fit adjustment.

In this embodiment, side panels or pouches are suspended from the horizontal straps 218 on either side of the vest 200, which may conveniently be made from the same material as the vest itself. Force-generating devices 124 are disposed in the side-mounted pouches, whereby the vest may be adapted to accommodate a wide variety of body sizes. The side-mounted force-generating devices 124 have been found effective for simulating body forces such as accelerations and the like. While this is the illustrated embodiment, other designs, such as a poncho style (i.e., without a front zipper) or fully enclosed side panels, are also contemplated. In addition, other suitable materials, such as cotton, wool, plastic, metal or other yet to be described composite materials, may alternatively be used for the garment 200 or device construction as long as the selected materials provide a solid backing structure and allow for articulation around various contoured surfaces of the body. When properly applied, the inner layer of the device is in contact with the user's body (or clothing).

The vest 200 is put on by the user and the front of the device is zipped closed. The shoulder fit can be adjusted by lifting the upper shoulder flap which is secured to the lower shoulder flap by a loop-and-hook closure system, such that portions of the sleeves 216 articulate within each other, creating a configuration of an inner and outer sleeve. The sleeves 216 can therefore be telescoped to increase or reduce the overall shoulder flap length. Once the proper fit is obtained, the loop-and-hook closure system is secured. Buckle straps are also integrated to secure the position, once achieved. Once these adjustments are made, the horizontal straps 218 are buckled and pulled snug; the straps are key to achieving a snug fit and optimizing the device functionality. While adjustable buckle straps are used in the preferred embodiment, other types of belt, loop-and-hook, elasticized or rubberized materials, or other type of binding systems can alternatively be used.

In the disclosed vest 200 the active cell zones include right chest 220, left chest 222, right abdomen (lower torso) 224, left abdomen (lower torso) 226, right upper back (not shown), left upper back (not shown), right lower back (not shown), left lower back (not shown), right side 228, and left side 230. The number of cell zones can vary with size and application and are outlined as an example only and in no way meant to limit the design of the device. For example, it is contemplated that smaller units such as arm covers may use four or more cell zones with force-generating devices. The vest 200 with side-mounted force-generating devices 124 is believed to be particularly beneficial for applications wherein simulated G-force responses is desired, such as car racing games where for realism a driver/player should experience acceleration, centrifugal force, braking force, etc. It has been found that selectively energizing larger force-generating devices 124 at a relatively gradual rate can effectively simulate such acceleration body forces.

While a vest is describe as an example of the technology, it is anticipated that other types of wearable garments can be constructed to expand the capabilities and functionality of the device. These would include a general purpose pad, binders, sleeves, gauntlets, gloves, pant legs, boots, or small strips for small applications, such as fingers or toes, or any other type of shape that can be applied to the user's body. These various device configurations may be secured to the user by a variety of means, such as belt, straps, or hook-and-loop closure systems. The various components can be utilized independent of each other using independent power supply and air sources, remain independent but using a single compressor system with multiple simultaneous air source connections (compressor manifold), or linked together in series or in parallel and utilizing the vest as the primary controller for the air and power requirements for the additional system components.

Figure 4:
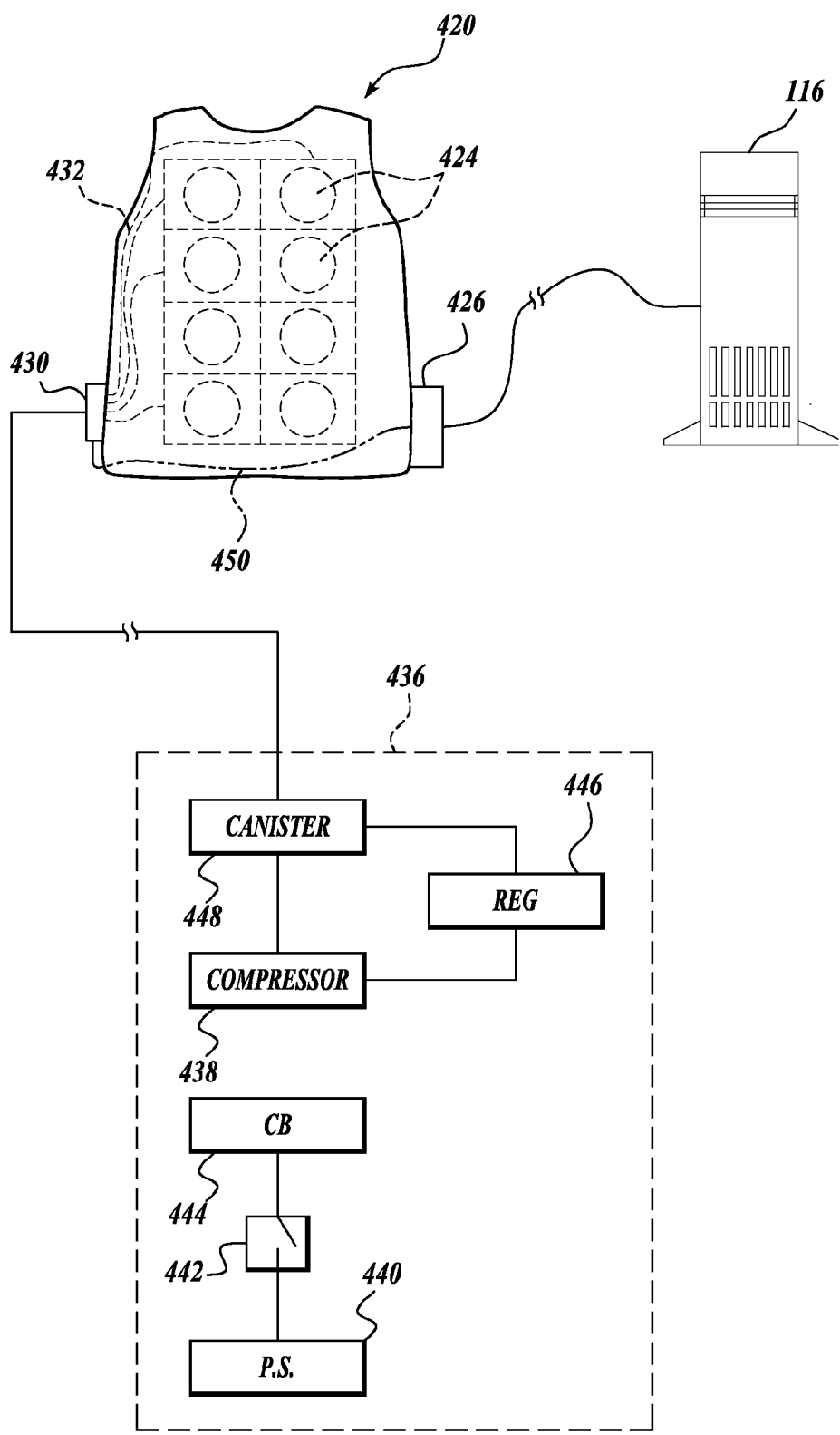
FIG. 4 is a schematic of an alternative playback interface system in a stand-alone configuration including a compressor system.
Figure 8:
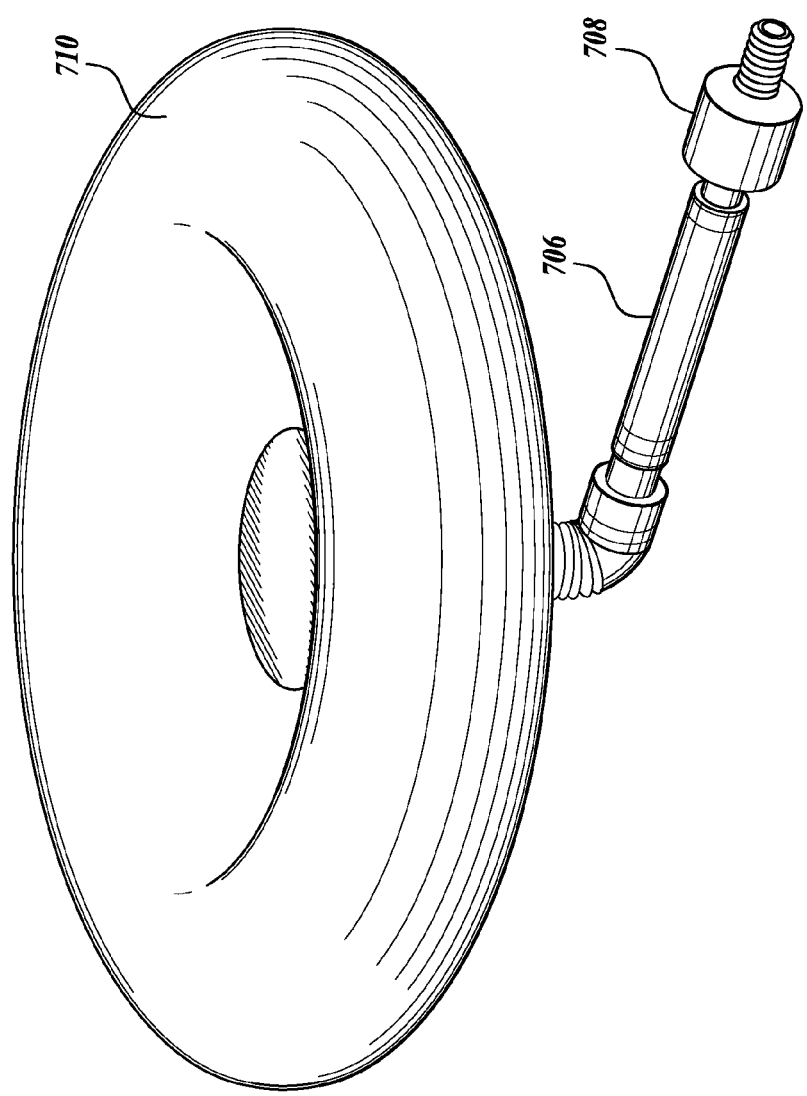
FIG. 8 is a perspective view of a pneumatic toroidal bladder for a force-generating device.

Referring now to FIG. 4, another illustrative embodiment of the present tactile technology platform for the playback interface 120 is based on a pneumatic system architecture. FIG. 4 shows a stand-alone wearable playback interface 420, similar to the playback interface 120 described above, here shown with eight forward force-generating devices 425 within cell zones 424. The force-generating devices 425 may be substantially identical to the pneumatic pressure cells shown in FIG. 8 of U.S. Pat. No. 6,726,638, incorporated by reference above, and therefore are not further described herein. Alternatively, electromechanical or other force-generating devices may be used to impart tactile stimuli to the user.

The wearable playback interface 420 consists of an array of force-generating devices 425 within cell zones 424. In this pneumatic embodiment, each force-generating device 425 comprises an expandable chamber or bladder with an intake/outlet line and a control valve to allow inflow and outflow of the pressurizing medium, e.g., air (see FIGS. 7 and 8). Although, this embodiment uses a pneumatic system, those skilled in the art will appreciate that alternative pressurizing mediums may be used, including for example, water, hydraulic fluid, or an electrochemical gel. The force-generating device 425 within each cell zones 424 is housed within an open face support, which may or may not incorporate a separate pressure sensing element.

The force-generating devices 425 face the user body. Any number of force-generating devices 124 can be incorporated into a wearable playback interface 420. In one embodiment, the playback interface 420 comprises a wearable vest that covers both the chest and back of the user, with force-generating cell zones 424 on the chest and back portions. The playback interface 420 has a bilayer construction into which a number of force-generating devices 425 are integrated. The orientation of the force-generating devices 425 is such that, on activation, a force is imparted towards the user's body. The wearable enclosure of the vest 420 may be made of any type of material designed to fit or be applied to any portion of the user's body. The overall size of the playback interface 420, as well as the number of cell zones 424 within the playback interface 420, may vary by device model to accommodate a particular application. In addition, devices capable of producing thermal temperature changes or vibratory stimuli can also be integrated into the cell structure or the pad in order to impart additional types of tactile information.

The current playback interface 420 includes a number of force-generating devices 425 in the front and back imbedded within the vest. Each of the force-generating devices 425 is connected by air lines 432 to corresponding control valves (FIG. 5) in a valve box 430 that regulates the inflow and outflow of the pressurizing medium, which in this embodiment is air.

A compressor system 436 provides a supply of compressed air at a sustained pressure level to the force-generating devices 425. In this embodiment, the compressor system 436 includes a housing which contains a single or dual head diaphragm compressor 438. Any type of piston or alternative compressor mechanism can be used, and this description is in no way meant to limit the scope of the invention. In addition to the compressor 438, the system 436 also includes a power supply 440, on-off control switch 442, compressor control circuitry 444, a pressure regulator 446, and a reservoir tank vessel or canister 448. Those skilled in the art will appreciate that other configurations of the compressor mechanism are possible. For example, the control circuitry 444 or the canister 448 or other components may be placed separately to accommodate a particular weight or size of the compressor system 436. Since air is being used as a pressurized medium, the design is a semi-closed system, entraining air from the atmosphere into the compressor mechanism and exhausting it to the atmosphere as well. Alternative pressurized mediums can be used and employ a closed circuit system architecture. The compressor mechanism is connected to the wearable vest using standard plastic tubing. The compressor mechanism can be run by either using batteries or plugging into an electrical outlet. The compressor mechanism may be designed to be small enough that it can also be incorporated into or onto the vest itself, making a completely wearable and self-contained product.

In addition to the force-generating devices 425, the control valves, hoses, and/or compressor 438 with the controlling circuitry 444 may also be incorporated into the playback module 420, for example, to produce an untethered, playback interface (e.g., using wireless communication means). The circuitry may include communication hardware and software to connect to the gaming device (be it a computer, hand held, or console device) and will typically communicate to the game system via a USB, serial, or wireless connection. The playback controller 426 is shown and is operably connected to the valve box 430 by cable 450, such that the playback controller 426 controls the activation and modulation of the force-generating devices 425. The playback controller 426 is operably connected to the user computer 116, which includes the gaming software utilizing the tactile event information library 112.

The playback controller 426 may also be responsible for decryption of the control commands sent to the playback interface 420 the game software itself. In one illustrative embodiment, the actual algorithms for valve actuation, including duration, sequence, and all associated variables used to denote the various types of tactile events, such as impact, pressure, G-force, etc., are embedded within the wearable playback interface 420 circuitry. In another illustrative embodiment, the algorithms are embedded within a software driver running on the user computer 116 whereby only final commands are sent to the control valves. Those skilled in the art will appreciate that any combination of hardware and firmware/software may be distributed among the playback interface 420, including various levels of functionality of the playback controller 426, and the user computer 116 to actuate the valves and cause tactile stimuli through the force-generating devices 425, without departing from the spirit of the present disclosures.

An alternative embodiment of the playback interface 420 also includes a self-regulating feedback loop that detects the user's reaction to the initial applied force, and uses that reaction to generate and apply a secondary force back to the user for additional detailed tactile stimuli. The preferred application for this advanced secondary feature is to provide an "injury stimulus" to the use. As an example, in real life, a traumatic event such as a gunshot wound or impact is associated with an initial stimulus, then a secondary lower level continuing pain response. The secondary tactile feedback circuit consists of the basic cell structure with the addition of a force sensor in each cell zone 424. The primary cell is stimulated by commands from the gaming software 114 via the playback controller 426. The appropriate force is then applied to the user. The force sensor directed at the user's body surface is then stimulated by the user's reaction to the original tactile event stimulus. This information derived from the force sensor is then transmitted back to the on-board circuit board. A microprocessor embedded in the vest 420 or playback controller 426, will interpret, under software control, the force sensor data and determine the most appropriate secondary tactile event information to send back to the user. A second set of commands will be used to reactivate the compressor and control valves in order to provide a second tactile stimulus to the user that is distinctly different from the original. The ability to modulate the original tactile information with subsequent secondary tactile information will allow for a greater depth and breadth of the tactile sensory information that can be imparted to the user. The system is able to provide the user with tactile sensory stimuli coordinated with the portrayed environmental conditions in order to give additional realism to the entertainment experience.

Other playback device configurations could incorporate single or multiple, multi-channel pressure transducer/resistor devices into each of the force-generating cells and the ability to link or network input and output information from multiple vests (for multiple users) simultaneously in real time, to allow for multiple users to interact with the game and each other in real time. This would be advantageous for use in online multiplayer game environments.

Figure 5:
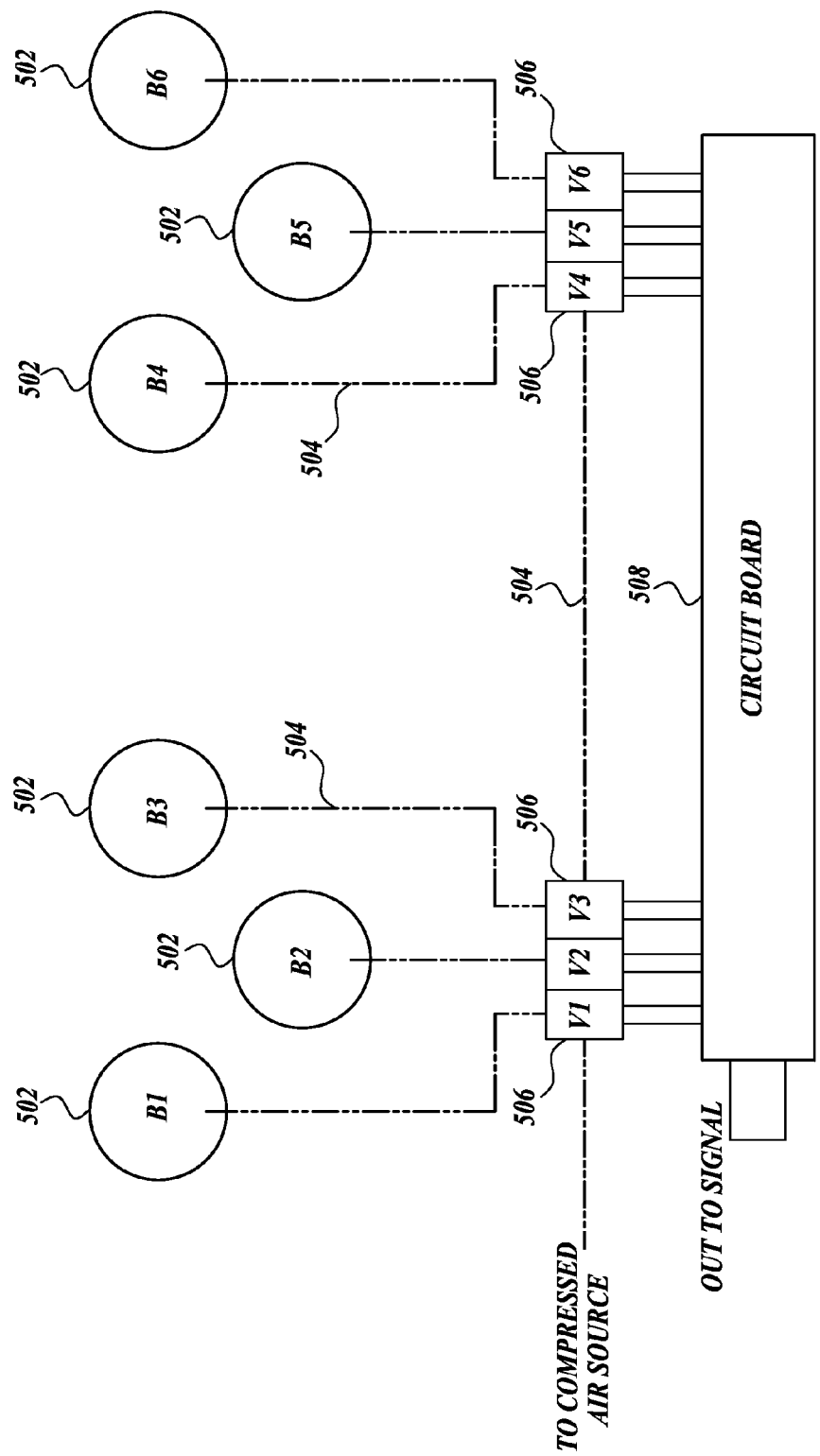
FIG. 5 shows a schematic diagram showing the fluid and electrical connections between bladders, valves and the control system for the vest shown in FIG. 4.

Now with reference to FIG. 5, in the illustrative pneumatic embodiment, each cell zone 424 includes a force-generating devices 425 which in this embodiment comprises an inflatable bladder 502. Associated pneumatic tubing 504 connects the bladder 502 to an associated control valve 506. The control valve 506 may be housed within the cell zone 424 itself or co-located with other cell zone control valves 506 and clustered in the valve box 430. The control valves 506 are electrically connected to a circuit board 508 that controls the operation of the control valves 506. In illustrative embodiments, the control valves 506 comprise three-way valves (inlet, outlet, vent) or four-way valves (inlet, outlet A, outlet B, vent) depending upon the device configuration. The four-way control valve may be used to control two bladders simultaneously and in synchrony, for example, for G-force applications where force is applied uniformly to simulate the experience of uniform gravitational and/or centrifugal force. The control valve 506 regulates the inflow and outflow of the pressurizing medium, such as air. Each of the control valves 506 is connected to an inlet manifold, which in turn, is connected to an inlet port mounted within the confines of the playback interface 420 itself. The compressor system provides a constant supply of air to the system.

The air bladder 502 in the current embodiment uses an air medium. The size of the bladder 502 may vary depending upon the type of impact or force events that will be emulated. Multiple articulated bladders taking a bellows type design (see FIG. 7) with a small rounded footprint can be used to generate bullet or projectile impact-type forces. Large diameter bladders such as pillow shapes or toroidal shapes (see FIG. 8) may be used to impart larger volume and high or low pressure stimuli to simulate various G-type or other body forces. Bladders may be used in various combinations or configurations to optimize the device's functionality for specific types of scenarios or games, or for a wide variety of general purpose scenarios. Bladder type devices may also include trapezoidal, pyramidal, triangular, spherical, or any other type of shape or combination in order to achieve a specific affect and shape. These examples are in no way meant to limit the scope of the device.

In operation, the gaming software 114, for example a combat game, generates a signal indicating a tactile event, such as a bullet hit or a blow to the body. The tactile event is transmitted as a command through the user computer hardware 116 to the playback controller 426, for example using the library 112. The playback controller 426 decodes the command to ascertain which force-generating device 425 must impart a force to the user's body. For example, in the game, if the bullet hits the upper right side of the player's chest, then the force-generating device 425 corresponding to the upper right side cell zone 424 is activated to simulate the bullet hit. The playback controller 426, in turn, sends a signal to the control circuit board 508 to open the appropriate valve 506 and direct the flow of pressurized air to the corresponding force-generating device 425.

It will be appreciated that the valves 506 may be operated to control the rate of pressurization/depressurization of the bladders 502, in order to generate a desired tactile response. For example, the timing, rate of opening, and frequency of the valve openings may be precisely controlled. It is contemplated that the pressure and/or extension of the bladders 502 may also be monitored, fed back to the valve controller, and used to achieve a desired tactile effect. Characteristics of the imparted force, such as intensity, duration, speed, or other characteristics may be simulated by modulation techniques, such as pulse-width modulation (PWM), whereby the corresponding valve is opened and closed in a controlled manner and for a controlled duration. Depending on the game, multiple force-generating devices 124 may be activated simultaneously to simulate multiple simultaneous events.

A function of a current embodiment of the device is to apply pressure and forces to the user's body to emulate variable G-Force and/or centrifugal effects. G-force is distinguished from other types of concentrated forces, such as bullet hits or punches, in that G-force acts on all particles of mass uniformly and simultaneously. Therefore, to effectively simulate G-force, the shape of the force-generating cell must be such that a firm and uniform force may be provided to and experienced by the user/player. Accordingly, in one illustrative embodiment, a toroidal shape may be used to generate a firm yet distributed force. In another illustrative embodiment, a pillow- or toroidal-shaped force-generating cell may be used with internal inflatable ribs to constrain non-uniform expansion or bulges in the middle of the pillow-shaped cell and provide a uniform and distributed force.

Using a racing car simulation as an example, and the user being the primary player of the game, acceleration of the vehicle would activate inflation of the chest right and left bladders. In real life, acceleration produces a gravity effect which uniformly pushes (as opposed to a point force) the driver back into their seat. Inflation of a forward bladder presents the user with an actual wide based force across the appropriate part of their body. The player's natural reaction is to react to the force and respond by pushing himself back into his seat to try to offset or avoid the applied force. The amount of variable acceleration will correspond to differences in bladder inflation times and/or volumes and thus will vary the magnitude of the acceleration effect. For deceleration events, the back bladders are inflated which will cause the user to move himself forward, and assume the normal motion of breaking or deceleration. High speed turns will force the driver towards the outer radius of the turn. As such, a high speed right turn would trigger a large volume inflation of the right hand side bladder, which would cause the user to shift himself leftward and thus their body would follow the outside radius of the turn. For a high speed left hand turn, the left side bladder would inflate and the user would naturally shift himself rightward. Variable levels of bladder inflation would be used to correspond to the various magnitude of the turn. Effects can be run solo or combined as would the natural forces that are encountered in real life action. Increasing numbers of bladders and various sizes and shapes can be used to enhance or change the effect.

The vest configuration thus provides the appropriate stimuli for G-effects along the X- and Y-axis of the user's body. Applying or simulating G-forces in the Z-axis are helpful for flight and spacecraft simulations, games, and media. Z-axis effects are obtained by utilizing the arm and leg garments, which are usually oriented at 90 degrees to the vest during normal game play or simulation. These additional devices are constructed of the same materials and utilizing the same general architecture and cell zone descriptions as described in detail above.

Figure 6:
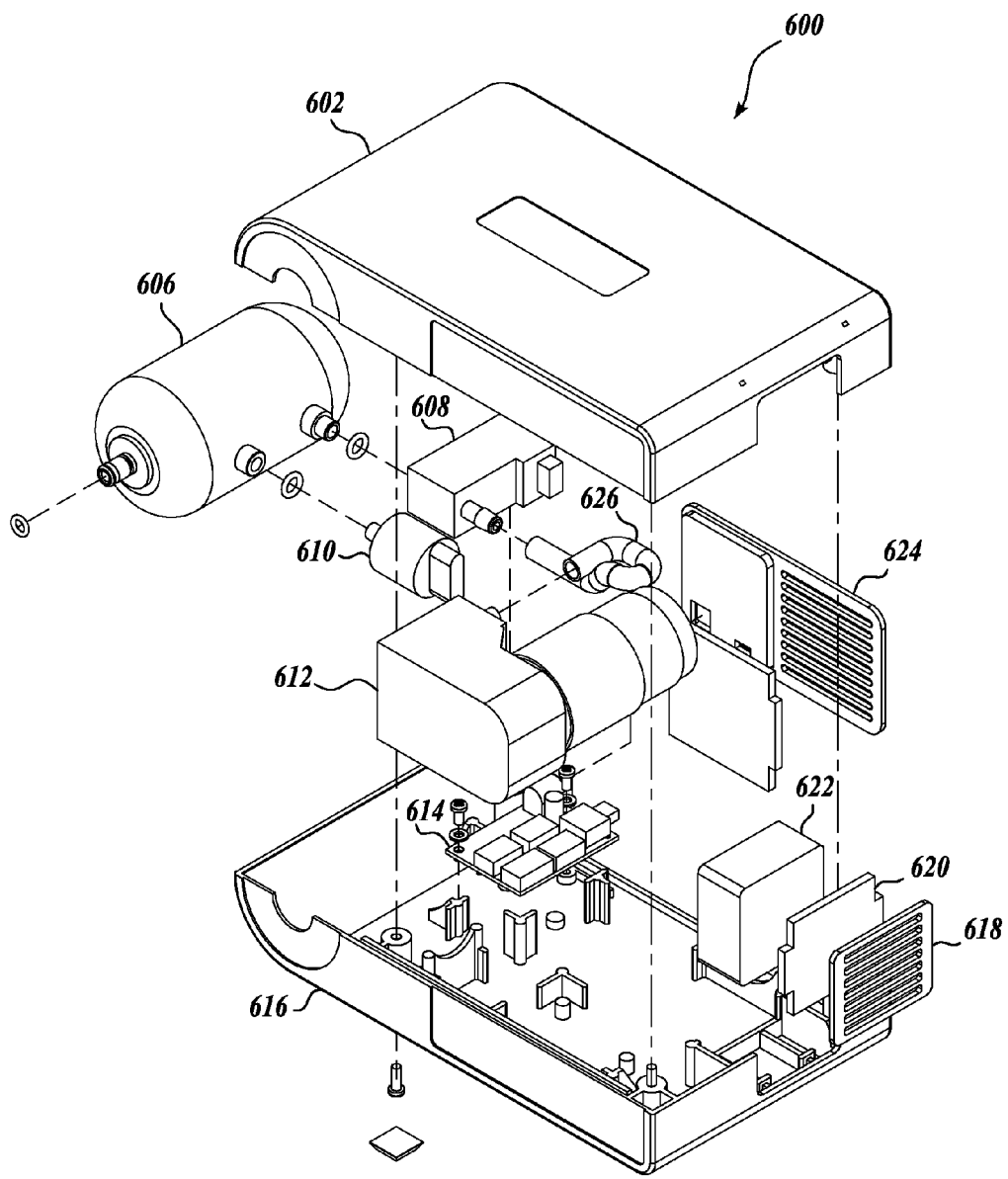
FIG. 6 shows a schematic diagram of the compressor system of FIG. 4 used to provide pressurized air to the bladders.

FIG. 6 is an illustrative embodiment of an integrated compressor system 600 similar to the compressor system 438 discussed above. The compressor system 600 provides pressurized air to the playback interface 120. The housing upper and lower halves 602 and 616 contain a compressor 612, a compressor control circuit 614, a valve 608, a pressure vessel or canister 606 coupled with the compressor 612 through the valve 608 and hose 626, a cooling fan 622, a filter 620, and vent grills 618 and 624. A pressure sensor 610 monitors the pressure of the vessel 606 and regulates this pressure by sending a signal to the circuit 614 to shut off the compressor 612 when a threshold pressure is reached. As air is used to inflate the force-generating device 425, the pressure in the vessel 606 drops, and the compressor 612 is started up to build the pressure back up to the predetermined threshold level. In one illustrative embodiment, the valve 608 is a three-way valve that serves the dual purpose of a safety check valve and pressure release valve. In operation, when the threshold pressure is reached, the pressure sensor 610 sends a signal to shut off the compressor 612, close the connection from the compressor 612 to the vessel 606 on the vessel side of the valve 608, and release the air in the hose 626 on the compressor side of the valve 608. This way the pressure head on the compressor in the hose 626 is zero (with respect to the atmospheric pressure). Upon start-up, without external pressure, the compressor 612 can start up more easily, consuming less power, and extending the life of the compressor 612. Additionally, because the vessel 606 is closed off by the valve 608, and the compressor 612 does not have to work to maintain the pressure threshold, the life of the compressor is further extended and more power is saved. Because the bladders 502 receive pressurized air through the control valves 506 from the pre-pressurized vessel 606, an ample supply of air is always available for operation.

When air is used as a pressurizing medium, the design is preferably a semi-closed system, obtaining air from the atmosphere into the compressor 612 and exhausting it to the atmosphere. In other embodiments, alternative pressurized mediums can be used and employ a closed circuit system architecture, for example, using circulating gas circuits analogous to refrigeration circuits. In addition, compressed gas systems utilizing a compressed gas source and regulator can also be used as a substitute "compressor" source. For example, it is contemplated that the compressed gas source may comprise a cylinder containing $CO_2$, or other suitable gas. In another alternative, a hybrid gas source may be provided, for example having both cylinders of a compressed gas, and a separate active air compressor.

In one illustrative embodiment, the compressor system 600 is connected to the vest 420 using standard plastic tubing. The compressor system 600 can be run by either using batteries or plugged into an AC electrical outlet. In this embodiment, the compressor system 600 is typically small enough to be incorporated into or onto the vest 420 itself making a completely wearable and self contained product. Alternatively, the compressor system 600 may be external to the vest 420.

Figure 7:
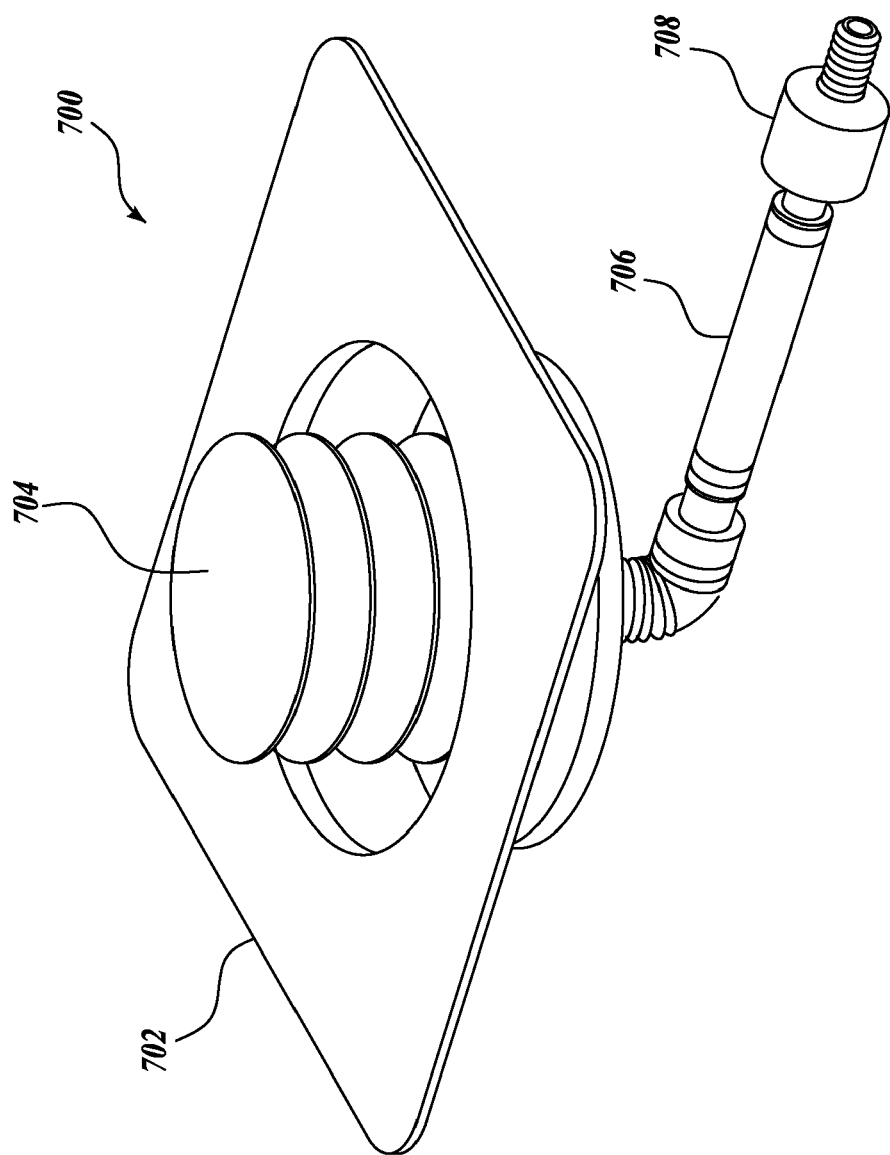
FIG. 7 is a perspective view of a pneumatic impact-type bladder for a force-generating device for the vest shown in FIG. 2.

A typical bladder structure 700 for impact-type cell zone is shown in FIG. 7. The cell zones 424 include an open face, semi-rigid plastic enclosure or housing 702 that is secured to the middle (backing layer), and facing the skin or clothing surface of the user. The housing 702 is secured to the middle (backing layer) and is used to hold the bladder 704 in proper orientation as well as giving rigid back support to help constrain the inflated bladder 704. In this embodiment the bladder 704 comprises a generally cylindrical, accordiated or pleated bladder. The housing 702 and bladder 704 may be made from any suitable material such as plastic and rubber. The inner layer overlies this open area of the support structure. This design allows the inflated bladder 704 to extend outwardly in a linear motion from the open face of the support 702 and against the elastic layer of Lycra against the user's body. The bladder 704 is oriented to impart a force towards the user's body. The bladder 704 is coupled to the air lines 504 and control valves 506 through a flexible hose 706 and a coupling 708. In one illustrative embodiment, the hose 706, the coupling 708, and air lines 504 may be integrated together and be made from a single piece of material. In another illustrative embodiment, the hose 706 and the coupling 708 are separate components coupled together, for example, by glue, thread, pressure-fit, or other equivalent coupling means.

While illustrative embodiments have been illustrated and described, it will be appreciated that various changes can be made therein without departing from the spirit and scope of the invention.

The embodiments of the invention in which an exclusive property or privilege is claimed are defined as follows:

1. A tactile wearable device comprising:
   a garment comprising a vest having a front panel configured to overlie a user's chest including a first plurality of pneumatic force-generating devices and a back panel configured to overlie the user's back including a second plurality of pneumatic force-generating devices, wherein the first and second plurality of pneumatic force-generating devices are each oriented and secured to the garment with a housing having an aperture through which the force-generating device extends;
   a compressed air source;
   a control valve assembly comprising a plurality of valves operatively coupling the first and second plurality of pneumatic force-generating devices to the compressed air source; and
   a controller operatively coupled with the control valve assembly to selectively open and close the valves to modulate the first and second plurality of pneumatic force-generating devices, wherein the controller controls the rate of pressurization of the force-generating devices by modulating the timing and duration of opening the plurality of valves.

2. The tactile wearable device of claim 1, wherein the first and second plurality of pneumatic force-generating devices comprise at least four force-generating devices.

3. The tactile wearable device of claim 1, further comprising a plurality of force sensors, each force sensor being associated with one of the pneumatic force-generating devices.

4. The tactile wearable device of claim 1, wherein the controller is adapted to receive control signals from a computer, and further wherein the controller selectively opens and closes the valves in response to the received control signals from the computer.

5. The tactile wearable device of claim 4, wherein the received control signals comprise signals generated based on events occurring in a computer game.

6. The tactile wearable device of claim 1, wherein the first plurality of pneumatic force-generating devices each comprise one of a toroidal bladder and a pleated cylinder.

7. The tactile wearable device of claim 6, wherein the compressed air source comprises a compressor and a canister.

8. The tactile wearable device of claim 1, wherein the compressed air source comprises at least one canister of a compressed gas.

9. The tactile wearable device of claim 1, wherein the controller is adapted to receive control signals from an apparatus having a display device displaying recorded media, and further wherein the controller selectively opens and closes the valves in response to the received control signals from the display device.

10. A tactile wearable device comprising:
a garment comprising a vest having a front panel configured to overlie a user's chest including a first plurality of pneumatic bladders for delivering a modulated force to the user wearing the garment and a back panel configured to overlie the user's back and including a second plurality of pneumatic bladders for delivering a modulated force to the user, wherein the first and second plurality of pneumatic bladders are each oriented and secured to the garment with a housing having an aperture through which the pneumatic bladder extends;
a plurality of air lines that connect the first and second plurality of pneumatic bladders with a source of pressurized air;
a control valve assembly comprising a plurality of valves that selectively control air flow from the source of pressurized air to the first and second plurality of pneumatic bladders; and
a controller operatively coupled with the control valve assembly to control generation of the modulated force according to a modulated control signal, wherein the controller controls the rate of pressurization of the pneumatic bladders by modulating the timing and duration of opening the plurality of valves.

11. The tactile wearable device of claim 10, wherein at least some of the pneumatic bladders comprise pleated cylindrical bladders.

12. The tactile wearable device of claim 10, wherein the first and second plurality of pneumatic bladders comprise at least four pneumatic bladders.

13. The tactile wearable device of claim 10, further comprising a plurality of force sensors, each force sensor being associated with one of the pneumatic bladders.

14. A method for delivering tactile stimuli to a user, the method comprising:
providing a tactile garment comprising a vest having a front panel configured to overlie the user's chest and a back panel configured to overlie the user's back, each panel including an array of bladders, wherein each bladder is secured to the tactile garment with a housing having an aperture through which the bladder extends;
providing a control valve assembly comprising a plurality of valves that operatively connects each of the bladders to a source of pressurized air;
receiving a modulated control signal by a controller coupled with the control valve assembly, the controller operating the control valve assembly to control the rate of pressurization of the array of bladders by modulating the timing and duration of opening the plurality of valves to generate a force inwardly to the body of a user wearing the tactile garment in accordance with the modulated control signal.

15. The method of claim 14, further comprising generating force data by a force sensor.

16. The method of claim 15, further comprising activating the control valve assembly in response to the force data generated by the force sensor.

17. A system for delivering tactile stimuli, the system comprising:
a signal generator component for generating a modulated control signal;
a tactile force software library for providing information to the signal generator component used in generating the modulated control signal;
a tactile garment comprising a vest having a front panel configured to overlie a user's chest and a back panel configured to overlie the user's back, each panel including a plurality of pneumatic force-generating devices for delivering a modulated force according to the modulated control signal to the user wearing the tactile garment, and wherein each of the pneumatic force-generating devices is oriented and secured to the tactile garment with a housing having an aperture through which the pneumatic force-generating device extends;
a power distribution network operatively coupled with the pneumatic force-generating devices for providing power to the pneumatic force-generating devices;
a controller operatively coupled with the pneumatic force-generating devices to control generation of the modulated force by the pneumatic force-generating devices according to a modulated control signal by controlling the rate of pressurization of the pneumatic force-generating devices by modulating the timing and duration of opening a plurality of valves; and
a power-switching component comprising the plurality of valves and operatively coupled with the power distribution network, the controller, and the pneumatic force-generating devices to control the flow of power to the pneumatic force-generating devices.

18. The tactile wearable device of claim 17, further comprising a plurality of force sensors, each force sensor associated with one of the pneumatic force-generating devices.

19. The tactile wearable device of claim 18, wherein the controller controls the generation of the modulated force in response to data obtained from the force sensors.

* * * * *